(12) United States Patent
Khare et al.

(10) Patent No.: US 8,160,342 B2
(45) Date of Patent: Apr. 17, 2012

(54) SYSTEM AND METHOD FOR PROCESSING DATA SIGNALS

(75) Inventors: Kedar Khare, Schenectady, NY (US); Christopher Judson Hardy, Schenectady, NY (US); Luca Marinelli, Schenectady, NY (US); Xiaodong Tao, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 539 days.

(21) Appl. No.: 12/394,398

(22) Filed: Feb. 27, 2009

(65) Prior Publication Data

US 2010/0220908 A1 Sep. 2, 2010

(51) Int. Cl.
*G06K 9/00* (2006.01)
(52) U.S. Cl. ........................................ 382/131
(58) Field of Classification Search .................. None
See application file for complete search history.

(56) References Cited

U.S. PATENT DOCUMENTS

| | | | |
|---|---|---|---|
| 7,006,567 B2 | 2/2006 | Frossard et al. | |
| 7,271,747 B2 | 9/2007 | Baraniuk et al. | |
| 7,346,219 B2 * | 3/2008 | Demaret et al. | 382/248 |
| 7,436,884 B2 | 10/2008 | Chen et al. | |
| 7,450,772 B2 * | 11/2008 | Bottou et al. | 382/240 |
| 2004/0230680 A1 | 11/2004 | Jain et al. | |
| 2006/0029279 A1 | 2/2006 | Donoho | |
| 2007/0053603 A1 | 3/2007 | Monro | |

OTHER PUBLICATIONS

Y. C. Pati, R. Rezaiifar & P. S. Krishnaprasad; "Orthogonal Matching Pursuit: Recursive Function Approximation with Applications to Wavelet Decomposition"; Signals, Systems and Computers, 1993,vol. 1;Conference Record of The Twenty-Seventh Asilomar Conference on Nov. 1-3, 1993; On pp. 40-44.
Mallat, S.G. Zhifeng Zhang; "Matching pursuits with time-frequency dictionaries"; IEEE Trans. Signal Proc., 41, Issue: 12; Dec. 1993; On pp. 3397-3415.
Thomas Blumensath, Mike E. Davies; "Gradient Pursuits"; Version: Nov. 14, 2007; Downloaded from Internet:<http://www.see.ed.ac.uk/~tblumens/papers/BDGP07.pdf>;14Pages.
Michael Lustig, David L. Donoho, Juan M. Santos and John M. Pauly; "Compressed Sensing MRI"; Downloaded from Internet<http://www.stanford.edu/~mlustig/CSMRI.pdf>: 38 Pages.
David L. Donoho, Yaakov Tsaig, Iddo Drori, Jean-Luc Starck; "Sparse Solution of Underdetermined Linear Equations by Stagewise Orthogonal Matching Pursuit"; Downloaded from Internet<http://www-stat.stanford.edu/~idrori/StOMP.pdf>; 39 Pages.

* cited by examiner

*Primary Examiner* — Tu Nguyen
(74) *Attorney, Agent, or Firm* — Jason K. Klindtworth

(57) ABSTRACT

A signal processing method include steps initializing a residual data signal representative of an acquired data signal, determining a significant coefficient corresponding to the residual data signal, updating the residual data signal using the significant coefficient to generate updated residual data signal, iteratively determining significant coefficients to generate a plurality of significant coefficients using the updated residual data signal, updating the plurality of significant coefficients by using a successive approximation technique, to improve the numerical accuracy of the significant coefficients and reconstructing a data signal using the updated plurality of significant coefficients.

15 Claims, 5 Drawing Sheets

SYSTEM AND METHOD FOR PROCESSING DATA SIGNALS

BACKGROUND

Embodiments of the invention relate generally to a field of processing data signals, and more specifically to reducing the number of data samples required for image/signal reconstruction.

With advances in various areas of technology, such as, but not limited to, imaging, networking, healthcare, audio, video entertainment and commmunication, huge volumes of data are frequently generated. More particularly, in imaging and healthcare applications, it may be desirable to acquire several images of one or more patients and subsequently store these images, thereby entailing use of considerable storage space and processing time. Similarly, communication applications call for reductions in bandwidth and an increase in data transmission speed to communicate data. Traditionally, data compression techniques have been employed to aid in the efficient storage of such data. Data compression may entail encoding information using fewer bits (or other information-bearing units) than an unencoded representation would use through use of specific encoding schemes. By compressing the data, consumption of expensive resources, such as hard disk space or transmission bandwidth may be substantially reduced. Conventional compression techniques are usually applied as a post-processing step after the image/signal is reconstructed from the measured data.

Compressed sensing is a field of technology being increasingly used to aid in reducing the data measurements required for reconstructing the desired image and/or signal. Through compressed sensing, it is recognized that images are often compressible and thus image data may be acquired with fewer data samples. The image reconstruction problem is typically cast as a system of linear equations representing images. Conventional sampling requires the number of data samples associated with an image to be on the order of the number of pixels N in the image. The aim of compressed sensing is to start with fewer data samples (less than N, typically the number of data samples is of the order of degrees of freedom M in the image), and still achieve good image quality.

Furthermore, compressed sensing reduces the number of data measurements required for image/signal reconstruction. In Magnetic Resonance (MR) imaging or Computed Tomography (CT) imaging, it is desirable to obtain information about a subject by measuring a digital signal representative of that subject. The measurement of digital signals results in construction of images, spectra, and volumetric images depicting the state of the subject, which may be a patient's body, a chemical in dilution, or a slice of the earth, for example. However, capturing and processing data related to the underlying subject involve laborious and time-consuming processes. By way of example, performing a Magnetic Resonance Imaging (MRI) scan of a patient, performing a three-dimensional (3D) CT scan of a patient, measuring a 3D nuclear magnetic resonance spectrum, and conducting a 3D seismic survey typically entail time-consuming processes. Compressed sensing is significant in these fields of technology as it enables lower x-ray dose (in the case of CT) and faster image acquisition for MR or CT, which could ameliorate problems, for instance, with cardiac and respiratory motion and contrast bolus timing in MR angiography.

Conventional methods for image reconstruction typically do not make any prior assumptions regarding the compressible nature of the final reconstructed images. Also, if an assumption about the compressible nature of the images is made, the methods used for image reconstruction may require substantial processing time. For example, while employing an orthogonal matching pursuit method for compressed sensing, once a significant wavelet co-efficient is selected, the corresponding wavelet is forward projected to the data domain and stored. This new data element is then orthogonalized with respect to all the previously selected data elements typically using QR decomposition and an updated solution is determined by solving a linear system of equations. As the number of selected elements increases, the QR decomposition step takes significant computational time. Also, all the forward projected data wavelets need to be stored, thereby increasing demands on storage means.

Thus, it is highly desirable to develop a compressed sensing technique that reduces processing time. More particularly, there is a need for an improved compressed sensing technique configured to enhance computational efficiency of signal processing, while substantially reducing memory requirements.

BRIEF DESCRIPTION

Briefly in accordance with one aspect of the technique a signal processing method is provided. The method provides for initializing a residual data signal representative of an acquired data signal, determining a significant coefficient corresponding to the residual data signal, updating the residual data signal using the significant coefficient to generate updated residual data signal, iteratively determining significant coefficients to generate a plurality of significant coefficients using the updated residual data signal, updating the plurality of significant coefficients by using a successive approximation technique to improve the numerical accuracy of the significant coefficients, and reconstructing a data signal using the updated plurality of significant coefficients. Systems and apparatus that afford functionality of the type defined by this method may be provided by the present technique.

In accordance with a further aspect of the present technique a system is provided. The system includes an acquisition subsystem configured to obtain data from an object and a processing subsystem in operational communication with the data acquisition subsystem. The processing subsystem further comprises a signal processing platform configured to initialize a residual data signal representative of an acquired data signal, determine a significant coefficient corresponding to the residual data signal, update the residual data signal using the significant coefficient to generate an updated residual data signal, iteratively determine significant coefficients to generate a plurality of significant coefficients using the updated residual data signal, update the plurality of significant coefficients by using a successive approximation technique, to improve the numerical accuracy of the significant coefficients, and reconstruct a data signal using the updated plurality of significant coefficients.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
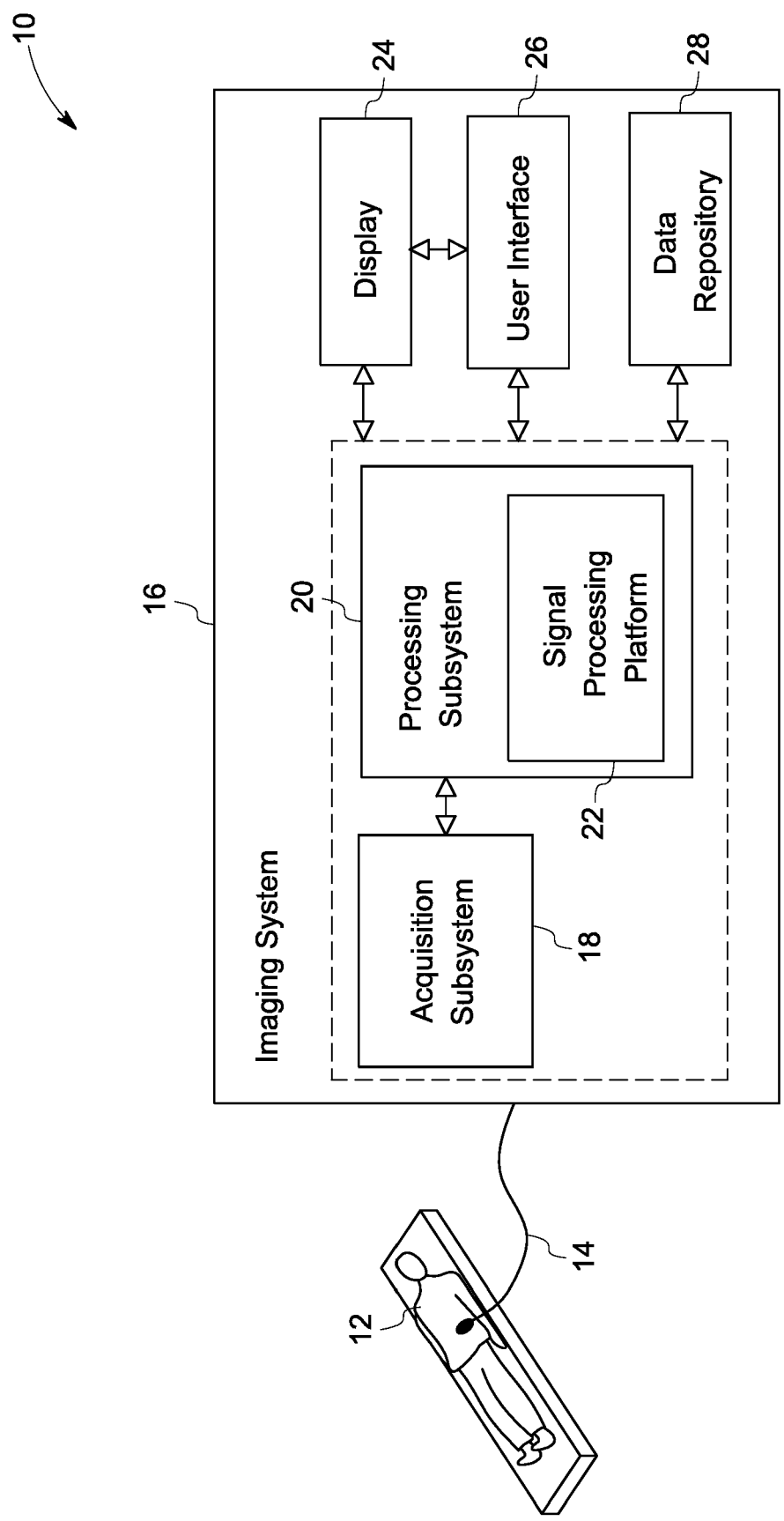
FIG. 1 is a block diagram of an exemplary diagnostic system, in accordance with aspects of the present technique.

FIG. 1 is a block diagram of an exemplary system 10 for processing image data, in accordance with aspects of the present technique. The system 10 may be configured to acquire image data from an object or a patient 12 via an image acquisition device 14. Although the present technique is described with reference to image data, it may be noted that the present technique may also find application with other data signals, such as, but not limited to audio signals, video signals, and the like. In one embodiment, the image acquisition device 14 may include a probe, where the probe may include an invasive probe, or a non-invasive or external probe, such as an external ultrasound probe, that is configured to aid in the acquisition of image data. Also, in certain other embodiments, image data may be acquired via one or more sensors (not shown) that may be disposed on the object or the patient 12. By way of example, the sensors may include physiological sensors (not shown) such as electrocardiogram (ECG) sensors and/or positional sensors such as electromagnetic field sensors or inertial sensors. These sensors may be operationally coupled to a data acquisition device, such as an imaging system, via leads (not shown), for example. Alternatively, the image acquisition device 14 may include detectors, in certain other embodiments.

The system 10 may also include an imaging system 16 that is in an operative association with the image acquisition device 14. Although the present example is described in terms of a medical imaging system, the present technique may also find application in other areas, such as, but not limited to industrial imaging systems and non-destructive evaluation and inspection systems, such as pipeline inspection systems and liquid reactor inspection systems. Additionally, the exemplary embodiments illustrated and described hereinafter may find application in multi-modality imaging systems that employ CT scanning and/or MR imaging in conjunction with other imaging modalities, position-tracking systems or other sensor systems.

In a presently contemplated configuration, the imaging system 16 may include an acquisition subsystem 18 and a processing subsystem 20. Further, the acquisition subsystem 18 of the imaging system 16 may be configured to acquire image data representative of one or more anatomical regions in the patient 12 via the image acquisition device 14. The image data acquired from the patient 12 may then be processed by the processing subsystem 20.

Additionally, the image data acquired and/or processed by the medical imaging system 16 may be employed to aid a clinician in identifying disease states, assessing need for treatment, determining suitable treatment options, and/or monitoring the effect of treatment on the disease states. In certain embodiments, the processing subsystem 20 may be further coupled to a storage system, such as a data repository 28, where the data repository 28 may be configured to receive and store image data.

In accordance with exemplary aspects of the present technique, the processing subsystem 20 may include a signal processing platform 22 that is configured to process the acquired image data to reconstruct an image. The signal processing platform 22 may also be configured to determine a plurality of significant coefficients associated with the acquired image data. As used herein the term "plurality of significant coefficients" is used to refer to coefficients associated with an image having significant involvement in reconstruction of an image. The signal processing platform 22 may also be configured to determine a numerically accurate plurality of significant coefficients. As used herein the term "numerically accurate plurality of significant coefficients" refers to the plurality of significant coefficients that are processed to remove error in their numerical values. Moreover, the signal processing platform 22 may also be configured to facilitate reconstruction of an image using the numerically accurate plurality of significant coefficients. The determination of a numerically accurate plurality of significant coefficients and reconstruction of an image using the numerically accurate plurality of significant coefficients will be explained in greater detail with reference to FIGS. 3-5.

Further, as illustrated in FIG. 1, the imaging system 16 may also include a display 24 and a user interface 26. However, in certain embodiments, such as in a touch screen, the display 24 and the user interface 26 may overlap. Also, in some embodiments, the display 24 and the user interface 26 may include a common area. In accordance with aspects of the present technique, the display 24 of the medical imaging system 16 may be configured to display an image generated by the imaging system 16 based on the image data acquired via the image acquisition device 14 and processed by the processing subsystem 20. Additionally, in accordance with further aspects of the present technique, the reconstructed image generated subsequent to processing of the acquired image data by the signal processing platform 22 may also be visualized on the display 24.

In addition, the user interface 26 of the imaging system 16 may include a human interface device (not shown) configured to facilitate users in manipulating the image data displayed on the display 24. The human interface device may include a mouse-type device, a trackball, a joystick, a stylus, or a touch screen configured to aid the users in the identification of the one or more regions of interest, for instance. However, other human interface devices, such as, but not limited to, a touch screen, may also be employed. Furthermore, in accordance with aspects of the present technique, the user interface 26 may be configured to aid the users in navigating through the images acquired, reconstructed or generated by the imaging system 16. Additionally, the user interface 26 may also be configured to aid in manipulating and/or organizing the reconstructed images displayed on the display 24.

Figure 2:
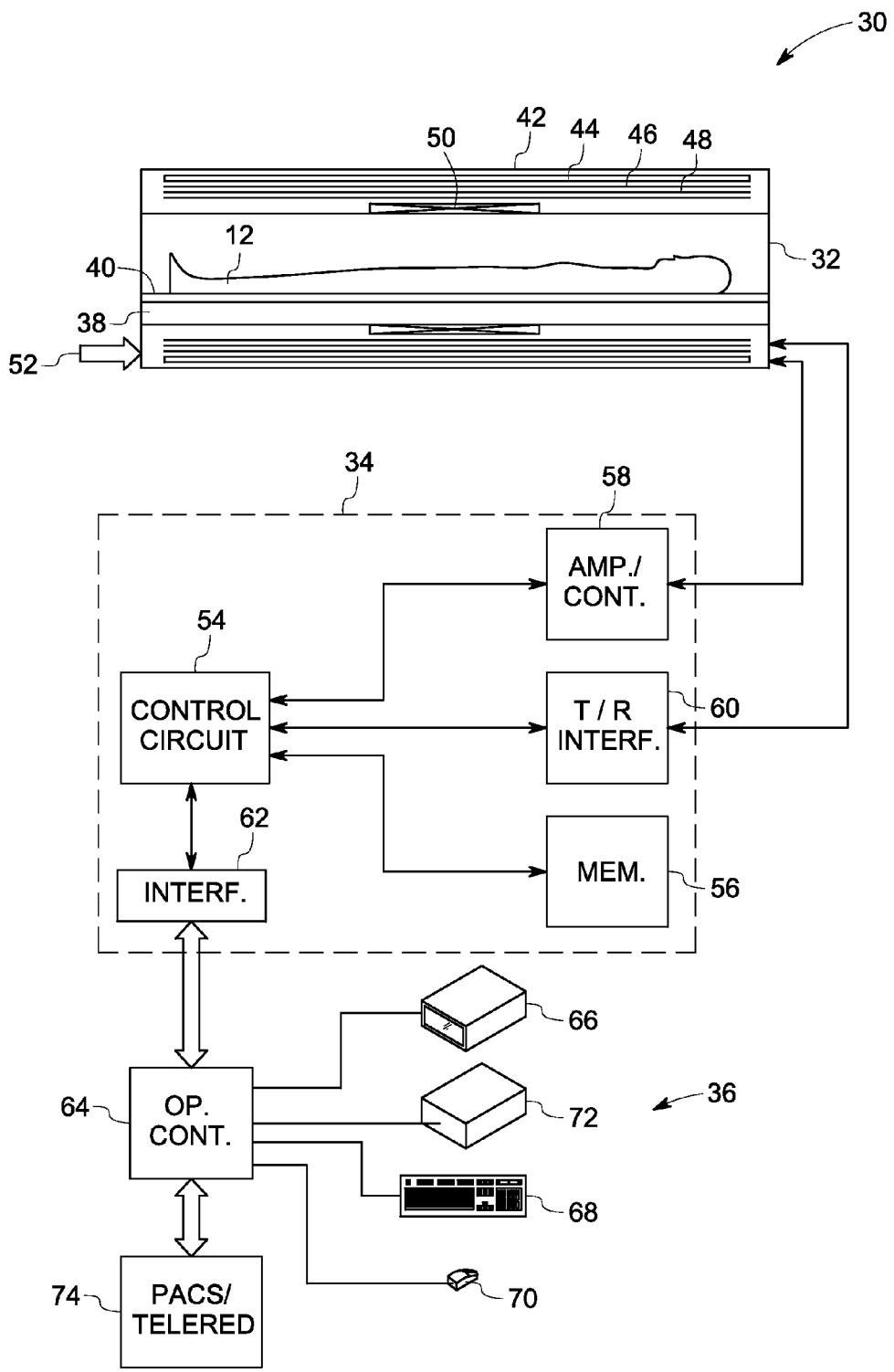
FIG. 2 is a block diagram illustrating an embodiment of an imaging system for use in the diagnostic system of FIG. 1, in accordance with aspects of the present technique.

FIG. 2 is a block diagram illustrating an MRI system 30 for processing image data, in accordance with aspects of the present technique. The MRI system 30 is illustrated diagrammatically as including a scanner 32, scanner control circuitry 34, and system control circuitry 36. While the MRI system 30 may include any suitable MRI scanner or detector, in the illustrated embodiment the system includes a full body scanner including a patient bore 38 into which a table 40 may be positioned to place the patient 12 in a desired position for scanning. The scanner 32 may be of any suitable type of rating, including scanners varying from 0.5 Tesla ratings to 1.5 Tesla ratings and beyond.

Additionally, the scanner 32 may include a series of associated coils for producing controlled magnetic fields, for generating radio-frequency (RF) excitation pulses, and for detecting emissions from gyromagnetic material within the patient 12 in response to such pulses. In the diagrammatical view of FIG. 2, a primary magnet coil 42 may be provided for generating a primary magnetic field generally aligned with patient bore 38. A series of gradient coils 44, 46 and 48 may be grouped in a coil assembly for generating controlled magnetic gradient fields during examination sequences. A RF coil 50 may be provided for generating radio frequency pulses for exciting the gyromagnetic material. In the embodiment illustrated in FIG. 2, the coil 50 also serves as a receiving coil. Thus, the RF coil 50 may be coupled with driving and receiving circuitry in passive and active modes for receiving emissions from the gyromagnetic material and for applying RF excitation pulses, respectively. Alternatively, various configurations of receiving coils may be provided separate from the RF coil 50. Such coils may include structures specifically adapted for target anatomies, such as head coil assemblies, and so forth. Moreover, receiving coils may be provided in any suitable physical configuration, including phased array coils, and so forth.

In a presently contemplated configuration, the gradient coils 44, 46 and 48 may have different physical configurations adapted to their function in the imaging system 30. The coils include conductive wires, bars or plates that are wound or cut to form a coil structure that generates a gradient field upon application of control pulses as described below. The placement of the coils within the gradient coil assembly may be done in several different orders. In one embodiment, a Z-axis coil may be positioned at an innermost location, and may be formed generally as a solenoid-like structure that has relatively little impact on the RF magnetic field. Thus, in the illustrated embodiment, gradient coil 48 is the Z-axis solenoid coil, while coils 44 and 46 are Y-axis and X-axis coils respectively.

The coils of the scanner 32 may be controlled by external circuitry to generate desired fields and pulses, and to read signals from the gyromagnetic material in a controlled manner. It may be noted that, when the material, typically bound in tissues of the patient, is subjected to the primary field, individual magnetic moments of the paramagnetic nuclei in the tissue partially align with the field. While a net magnetic moment is produced in the direction of the polarizing field, the randomly oriented components of the moment in a perpendicular plane generally cancel one another. During an examination sequence, an RF frequency pulse is generated at or near the Larmor frequency of the material of interest, resulting in rotation of the net aligned moment to produce a net transverse magnetic moment. This transverse magnetic moment precesses around the main magnetic field direction, emitting RF signals that are detected by the scanner 32 and processed for reconstruction of the desired image.

Furthermore, the gradient coils 44, 46 and 48 may be configured to facilitate generation of precisely controlled magnetic fields, the strength of which vary over a predefined field of view, typically with positive and negative polarity. When each coil is energized with known electric current, the resulting magnetic field gradient is superimposed over the primary field and produces a desirably linear variation in the Z-axis component of the magnetic field strength across the field of view. The field varies linearly in one direction, but is homogenous in the other two. The three coils have mutually orthogonal axes for the direction of their variation, enabling a linear field gradient to be imposed in an arbitrary direction with an appropriate combination of the three gradient coils.

Moreover, the pulsed gradient fields perform various functions integral to the imaging process. Some of these functions are slice selection, frequency encoding and phase encoding. These functions may be applied along the X-axis, Y-axis and Z-axis of the original coordinate system or along other axes determined by combinations of pulsed currents applied to the individual field coils.

Also, the slice select gradient determines a slab of tissue or anatomy to be imaged in the patient. The slice select gradient field may be applied simultaneously with a frequency selective RF pulse to excite a known volume of spins within a desired slice that precess at the same frequency. The slice thickness is determined by the bandwidth of the RF pulse and the gradient strength across the field of view.

The frequency encoding gradient is also known as the readout gradient, and is usually applied in a direction perpendicular to the slice select gradient. In general, the frequency encoding gradient is applied before and during the formation of the magnetic resonance (MR) echo signal resulting from the RF excitation. Spins of the gyromagnetic material under the influence of this gradient are frequency encoded according to their spatial position along the gradient field. By Fourier transformation, acquired signals may be analyzed to identify their location in the selected slice by virtue of the frequency encoding.

Finally, the phase encode gradient is generally applied before the readout gradient and after the slice select gradient. Localization of spins in the gyromagnetic material in the phase encode direction may be accomplished by sequentially inducing variations in phase of the precessing protons of the material using slightly different gradient amplitudes that are sequentially applied during the data acquisition sequence. The phase encode gradient permits phase differences to be created among the spins of the material in accordance with their position in the phase encode direction.

In addition, a great number of variations may be devised for pulse sequences employing the exemplary gradient pulse functions described hereinabove as well as other gradient pulse functions not explicitly described here. Moreover, adaptations in the pulse sequences may be made to appropriately orient both the selected slice and the frequency and phase encoding to excite the desired material and to acquire resulting MR signals for processing.

The coils of the scanner 32 are controlled by scanner control circuitry 34 to generate the desired magnetic field and RF pulses. In the diagrammatical view of FIG. 2, the control circuitry 34 thus includes a control circuit 54 for commanding the pulse sequences employed during the examinations, and for processing received signals. The control circuit 54 may include any suitable programmable logic device, such as a CPU or digital signal processor of a general purpose or application-specific computer. Also, the control circuit 54 may further include memory circuitry 56, such as volatile and non-volatile memory devices for storing physical and logical axis configuration parameters, examination pulse sequence descriptions, acquired image data, programming routines, and so forth, used during the examination sequences implemented by the scanner.

Interface between the control circuit 54 and the coils of the scanner 32 is managed by amplification and control circuitry 58 and by transmission and receive interface circuitry 60. The amplification and control circuitry 58 includes amplifiers for each gradient field coil to supply drive current to the field coils in response to control signals from control circuit 54. Transmit/receive (T/R) circuitry 60 includes additional amplification circuitry for driving the RF coil 50. Moreover, where the RF coil 50 serves both to emit the RF excitation pulses and to receive MR signals, the T/R circuitry 60 may typically include a switching device for toggling the RF coil 50 between active or transmitting mode, and passive or receiving mode. A power supply, denoted generally by reference numeral 52 in FIG. 2, is provided for energizing the primary magnet 42. Finally, the range control circuitry 34 may include interface components 62 for exchanging configuration and image data with system control circuitry 36. It should be noted that, while in the present description reference is made to a horizontal cylindrical bore imaging system employing a superconducting primary field magnet assembly, the present technique may be applied to various other configurations, such as scanners employing vertical fields generated by superconducting magnets, permanent magnets, electromagnets or combinations of these means.

The system control circuitry 36 may include a wide range of devices for facilitating interface between an operator or radiologist and the scanner 32 via the scanner control circuitry 34. In the illustrated embodiment, for example, an operator controller 64 is provided in the form of a computer workstation employing a general purpose or application-specific computer. The workstation also typically includes memory circuitry for storing examination pulse sequence descriptions, examination protocols, user and patient data, image data, both raw and processed, and so forth. Further, the workstation may further include various interface and peripheral drivers for receiving and exchanging data with local and remote devices. In the illustrated embodiment, such devices include a conventional computer keyboard 68 and an alternative input device such as a mouse 70. A printer 72 may be provided for generating hard copy output of documents and images reconstructed from the acquired data. Moreover, a computer monitor 66 may be provided for facilitating operator interface. In addition, the system 30 may include various local and remote image access and examination control devices, represented generally by reference numeral 74 in FIG. 2. Such devices may include picture archiving and communication systems, teleradiology systems, and the like.

Figure 3:
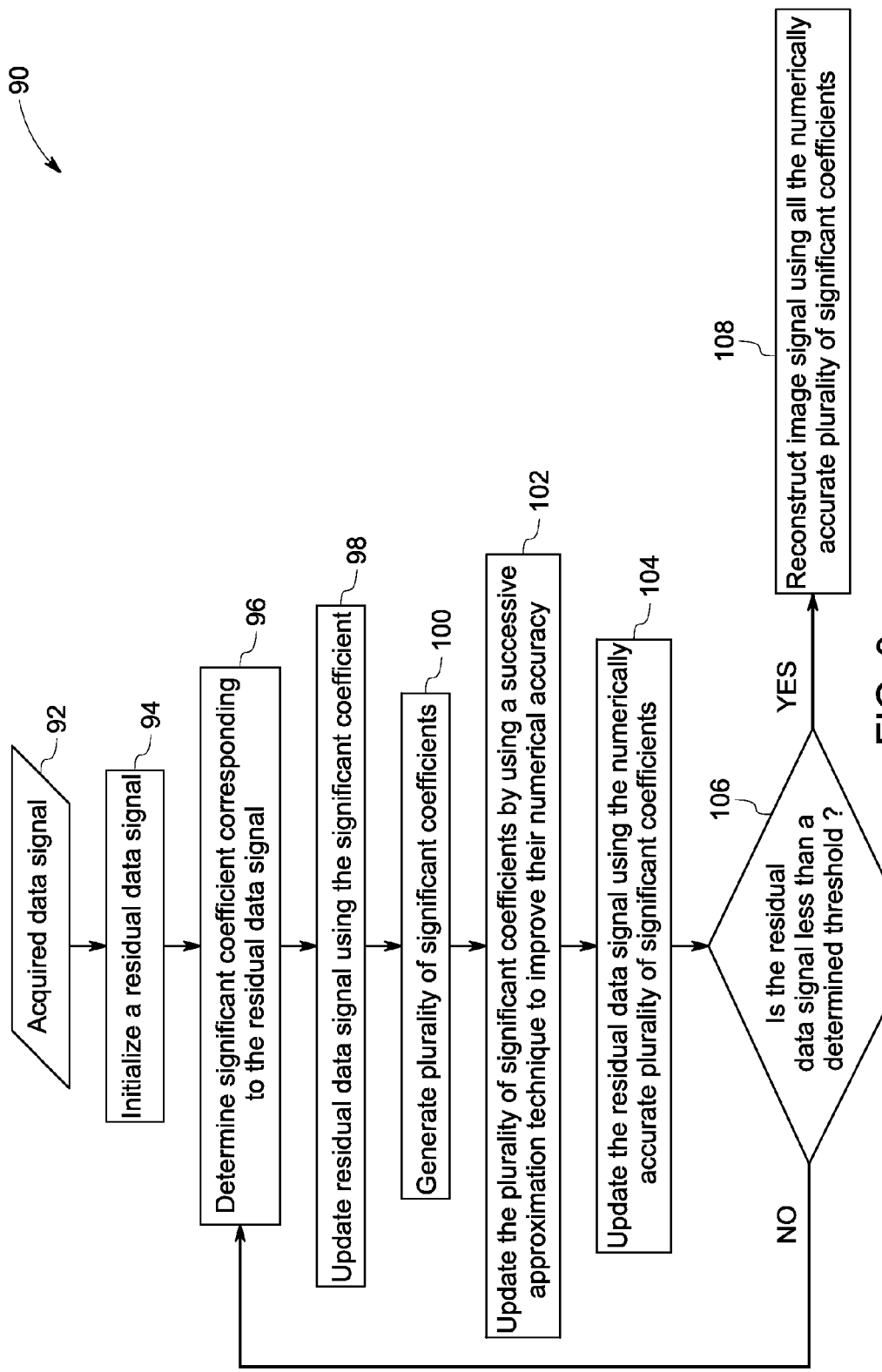
FIG. 3 is a flow chart illustrating an exemplary signal processing method, in accordance with aspects of the present technique.

Referring now to FIG. 3, a flow chart 90 illustrating an exemplary data signal processing method, in accordance with aspects of the present technique, is depicted. Reference numeral 92 may be representative of an acquired data signal. For example, the data signal 92 may be acquired by the imaging system 16, and more particularly by the acquisition subsystem 18 (See FIG. 1). The method starts at step 94, where a residual data signal may be initialized. As used herein and elaborated in detail below, the term "residual data signal" is used to refer to a data signal that results when the contribution of previously determined significant coefficients is subtracted from the acquired data signal. In the illustrated example, the residual data signal may be initialized to the acquired data signal 92, where the acquired data signal 92 may be representative of the data acquired by the imaging system 16 (See FIG. 1). For example, if the acquired data signal 92 is represented by "f" and the residual data signal is represented by "r", then in step 94 r=f. Subsequently, as indicated by step 96, the residual data signal r is used to determine at least one significant coefficient $s_1$ corresponding to the residual data signal r. In one embodiment, the significant coefficient $s_1$ is an important parameter that represents the residual data signal r. The determination of the significant coefficient may be better understood with reference to FIG. 4.

Figure 4:
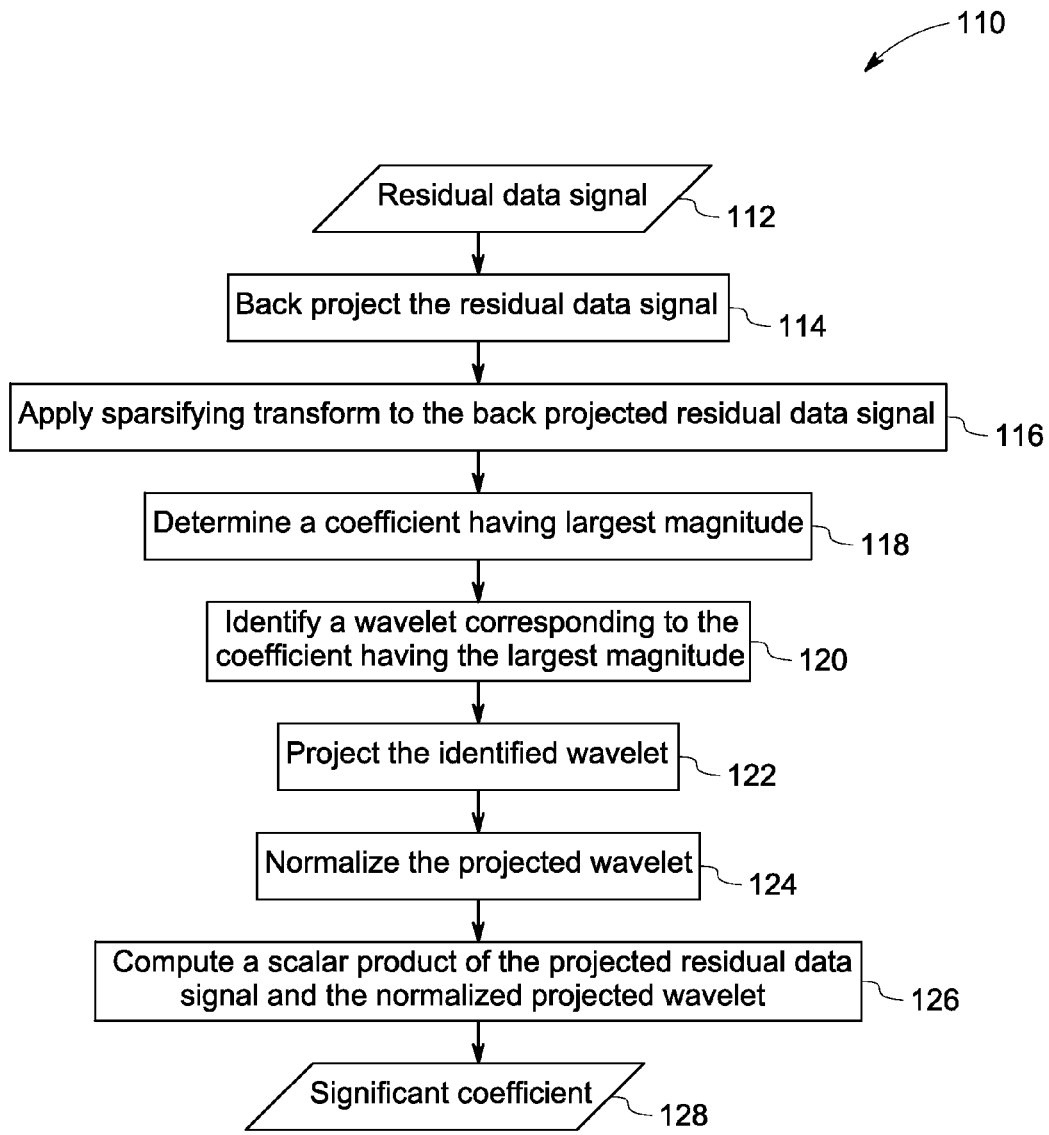
FIG. 4 is a flow chart illustrating an exemplary process of determining a significant coefficient, in accordance with aspects of the present technique.

Turning now to FIG. 4, a flow chart 110 illustrating an exemplary process of determining a significant coefficient corresponding to a residual data signal 112, in accordance with aspects of the present technique, is depicted. In other words, step 96 of FIG. 3 for determination of a significant coefficient corresponding to a residual data signal is illustrated in greater detail in FIG. 4. For example, determination of the significant coefficient si corresponding to the residual data signal r 112 is depicted in FIG. 4. In one embodiment, the residual data signal r 112 may include a signal representative of image data. The method starts at step 114, where the residual data signal r is back projected to the image domain resulting in a back projected residual data signal. For example, back projection of the residual data signal r 112 may result in a back projected residual data signal that may be represented as $p^H(r)$. Alternatively, the residual data signal r may be forward projected at step 114.

Further, at step 116, the back projected residual data signal $p^H(r)$ may be processed via application of a sparsifying transformation. The sparsifying transformation may include a wavelet transformation, in one embodiment. However, other sparsifying transformations, such as, but not limited to total variation, gradient, soft/hard thresholding may also be used. Consequent to processing at step 116, a sparsified residual data signal may be generated and may generally be represented by $S^H(r)$.

Subsequently, as depicted by step 118, a coefficient having a largest magnitude corresponding to the sparsified residual data signal $S^H(r)$ may be determined. Additionally, at step 120, a wavelet of the sparsified residual data signal $S^H(r)$ corresponding to the coefficient having largest magnitude determined at step 118 may be computed. Moreover, in certain embodiments, the determined wavelet may be projected to determine a corresponding projected wavelet, as indicated by step 122. In one embodiment, the projection of the wavelet may include a forward projection. In an alternative embodiment, the projection of the wavelet may include a backward projection.

With continuing reference to FIG. 4, the projected wavelet generated at step 122 may be normalized at step 124. Furthermore, at step 126, a scalar product of the residual data signal r 112 and the normalized projected wavelet generated at step 124 may be computed. The scalar product of the residual data signal r 112 and the normalized projected wavelet results in a significant coefficient 128, such as the significant coefficient $s_1$. As used herein, the term "scalar product" refers to elementwise product of two vectors followed by their summation.

With returning reference to FIG. 3, at step 98, the residual data signal r 112 may be updated. More particularly, at step 98, the residual data signal r 112 may be updated by removing a data signal corresponding to the significant coefficient $s_1$ 128 (See FIG. 4) from the acquired data signal f. In an exemplary embodiment, if a data signal corresponding to the significant coefficient $s_1$ is represented by $d_1$, then at step 98 the residual data signal r is updated to correspond to a signal obtained by subtracting $d_1$ from the acquired data signal f. Thus, if the updated residual data signal is represented by $r_1$, then $r_1$ is computed as follows:

$$r_1 = f - d_1 \quad (1)$$

Furthermore, as indicated by step 100, a plurality of significant coefficients may be generated. Accordingly, steps 96 and 98 may be iteratively performed to determine the plurality of significant coefficients corresponding to the residual data signal r. More particularly, the updated residual data signal $r_1$ may be employed to determine a corresponding significant coefficient $s_2$, for example. In other words, the updated residual data signal $r_1$ may be processed via steps 114-126 (See FIG. 4) to determine the corresponding significant coefficient $s_2$. Subsequently, the significant coefficient $s_2$ may be appended to the plurality of significant coefficients. In one embodiment, the plurality of significant coefficients may include a list of significant coefficients. Accordingly, each time a significant coefficient is determined, that significant coefficient may be appended to the list. By way of example, significant coefficient $s_1$ may be included in the list of significant coefficients. Subsequently significant coefficient $s_2$ may also be appended to the list of significant coefficients. In other words, the list of significant coefficients now includes $s_1$ and $s_2$.

It may be noted that the residual data signal r is updated in each iteration by subtracting data signals corresponding to the determined plurality of significant coefficients from the acquired data signal f. Also, steps 96-98 are iterated through to generate the plurality of significant coefficients in step 100. Step 100 may be better understood with reference to FIG. 5.

Figure 5:
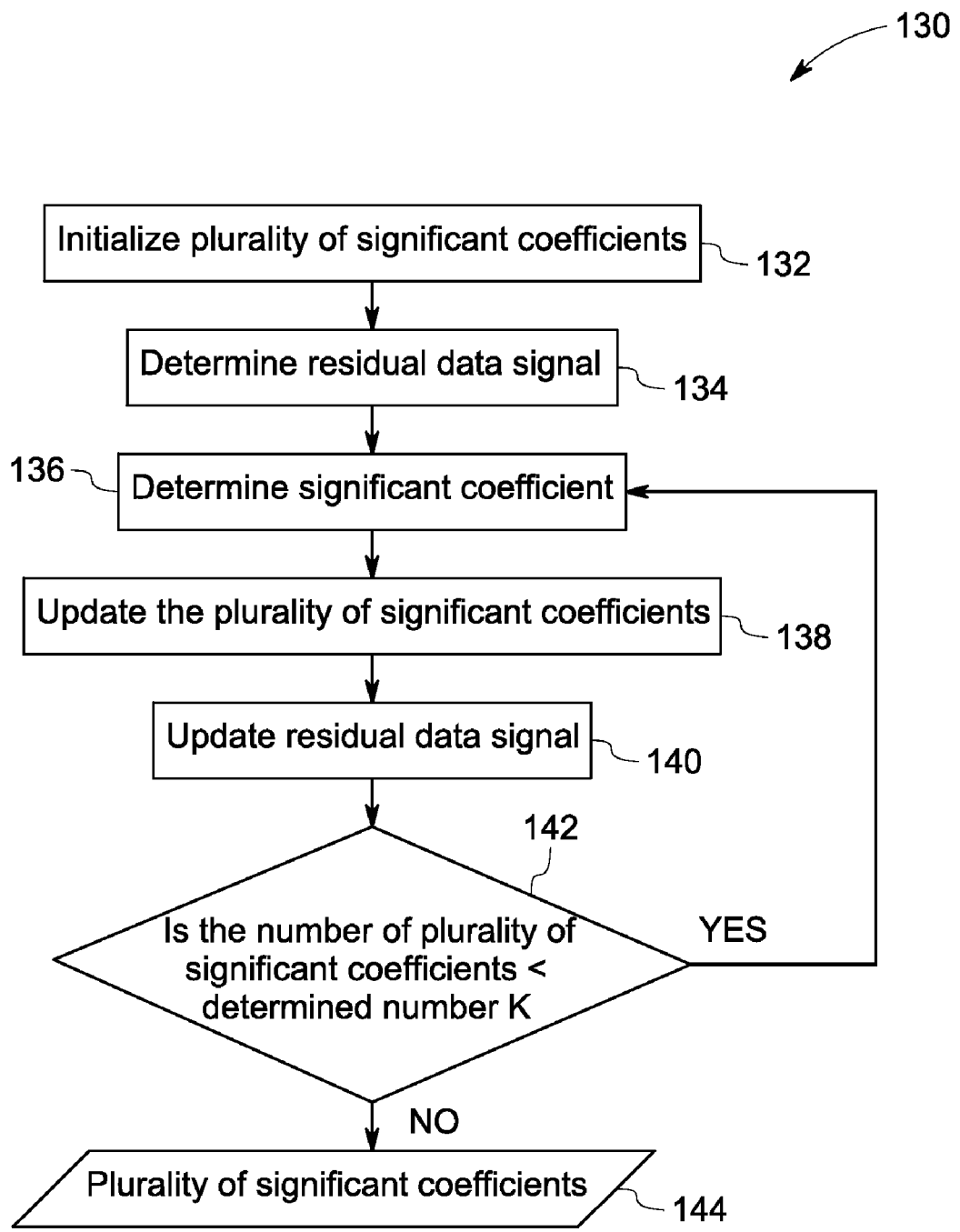
FIG. 5 is a flow chart illustrating an exemplary process of generating plurality of significant coefficients, in accordance with aspects of the present technique.

FIG. 5, is a flow chart 130 illustrating an exemplary process of generating the plurality of significant coefficients, in accordance with aspects of the present technique. In other words, the processing of step 100 of FIG. 3 is presented in further detail. The method starts at step 132, where the plurality of significant coefficients are initialized. As previously noted, the plurality of significant coefficients may include a list of significant coefficients, in certain embodiments. Accordingly, the list of significant coefficients may be initialized such that there are no entries in the list.

Subsequently, at step 134 a residual data signal may be updated. (See FIG. 3, step 98). In one embodiment, before the plurality of significant coefficients have been determined, the residual data signal r may be initialized to the acquired data signal 42 f (See FIG. 3, step 94). This residual data signal r is subsequently used to determine the corresponding significant coefficient s as indicated by step 136. More particularly, the residual data signal may be processed via. steps 114-126 (See FIG. 4) to determine corresponding significant coefficient s.

Further, at step 138, the plurality of significant coefficients may be updated by including the determined significant coefficient in the plurality of significant coefficients. The updated plurality of significant coefficients may then be used to update the residual data signal as depicted by step 140. As previously noted, the residual data signal may be updated by subtracting data signals corresponding to the determined plurality of significant coefficients from the acquired data signal. For instance, if the significant coefficients in the plurality of significant coefficients include $s_1$, $s_2$, $s_3$, $s_4$ and $s_5$ and corresponding data signals are represented respectively by $d_1$, $d_2$, $d_3$, $d_4$ and $d_5$, then an updated residual data signal r may be computed as follows:

$$\text{Updated } r = f - (d_1 + d_2 + d_3 + d_4 + d_5). \quad (2)$$

Subsequently, at step 142, a check is carried out to verify if the number of significant coefficients appended to the plurality of significant coefficients is less than a determined number K. At step 142, if the number of significant coefficients comprising the plurality of significant coefficients is less than the determined number K, the control is transferred at step 136 and steps 136 to 140 are repeated. Furthermore, when the number of significant coefficients becomes equal to or exceeds the determined number K, further updation of the plurality of significant coefficients is stopped resulting in the complete plurality of significant coefficients 144. In one embodiment, the number K may be equal to or greater than 1. In still another embodiment when the signal is an image signal, the number of significant coefficients K is small compared to total number of pixels N in the image signal.

With returning reference to FIG. 3, the plurality of significant coefficients 144 (see FIG. 5) generated at step 100 are updated to reduce the effect of erroneous or less significant coefficients from the plurality of significant coefficients 144 as indicated by step 102, and to improve the numerical accuracy of the plurality of significant coefficients 144. As used herein, the term "erroneous or less significant coefficients" is used to refer to the significant coefficients in the plurality of significant coefficients that are not numerically accurate and include error.

The effect of erroneous or less significant coefficients may be reduced by processing the plurality of significant coefficients 144. In accordance with an exemplary aspect of the present technique, the plurality of significant coefficients in step 102 are updated via application of a successive approximation technique. Further, the successive approximation technique may be repeated until the plurality of significant coefficients in step 144 achieve stable numerical values resulting in a numerically accurate plurality of significant coefficients. In one embodiment, the plurality of significant coefficients achieve stable numerical values when the application of the successive approximation technique does not change numerical values of the significant coefficients in the plurality of significant coefficients. In certain embodiments, the successive approximation technique may include a least squares technique, a conjugate gradient technique, a landweber technique, or the like. In another embodiment, a least squares technique may include a constrained least squares technique. A least squares technique may be employed to identify the less or erroneous significant coefficients by iteratively minimizing a square of a difference between the acquired data signal and data signals representative of the plurality of significant coefficients. For example, if the plurality of significant coefficients L include significant coefficients $s_1$, $s_2$, $s_3$, $s_4$ and $s_5$ and corresponding data signals to the significant coefficients $s_1$, $s_2$, $s_3$, $s_4$ and $s_5$ are $d_1$, $d_2$, $d_3$, $d_4$ and $d_5$, then the least square technique is applied such that $|[f-(d_1+d_2+d_3+d_4+d_5)]|^2$ is minimized. Consequent to the application of successive approximation technique, updated plurality of significant coefficients are determined. It may be noted that the terms "updated plurality of significant coefficients" and "numerically accurate plurality of significant coefficients" may be used interchangeably.

Further to processing by steps 94-102, at step 104, an updated residual data signal is determined using the numerically accurate plurality of significant coefficients determined at step 102. Subsequently, at step 106, a check is carried out to verify if a value of the residual data signal updated at step 104 is less than a determined threshold value. At step 106, if it is verified that the updated residual data signal has a value less than the determined threshold value, then the processing is stopped, and all the numerically accurate plurality of significant coefficients are used to reconstruct the image as indicated by step 108. In other words, if the value of the updated residual data signal is less than the determined threshold value, it may be indicative of the fact that all the numerically accurate plurality of significant coefficients corresponding to all the residual data signals have been determined. The determined threshold value may be selected based on a desirable quality of reconstructed data, processing speed of the processing subsystem 20 (see FIG. 1), accuracy of the reconstructed data, and type of data signal, for example. With returning reference to the decision block 106, if the updated residual data signal has a value greater than the determined threshold, the control is passed back to step 96 and the steps 96-104 are repeated.

As noted hereinabove, the present technique may find application in various data signals such as, but not limited to, audio signals, video signals, image data signals and the like. The signal processing method illustrated in FIG. 3 may be better understood by application of the present technique to an image data signal. The reconstruction of an image by application of the present technique to acquired image data is described hereinafter. The acquired data signal 92 (See FIG. 3) may be used to reconstruct an image signal g. A reconstructed image signal g having N pixels may be represented as shown in equation (3).

$$g = \sum_{n=0}^{N-1} \alpha_n \phi_n \quad (3)$$

where $\alpha_n$ is a coefficient corresponding to wavelet $\phi_n$.

Further, as previously described with reference to FIG. 3, initially a residual data signal $r_0$ may be initialized to the acquired image data signal f. In other words, the residual data signal $r_0$ is representative of the acquired image data signal f. As used herein, the residual data signal $r_k$ is representative of a data signal remaining after contribution of data signals corresponding to k significant coefficients are deleted from the acquired data signal.

Subsequently, the residual image signal $r_k$ is backward projected and a wavelet transform (WT) may be applied to the backward projected residual data signal to determine a coefficient having a largest magnitude. The determination of the coefficient having the largest magnitude may be represented as follows:

$$\alpha_k = \max\{abs(WT(P^H r_k))\} \quad (4)$$

where WT is wavelet transform, $P^H$ is the backward projection, abs is an absolute value and $\alpha_k$ is a coefficient having a largest magnitude corresponding to the residual image signal $r_k$.

The coefficient $\alpha_k$ is used to determine the corresponding wavelet $\phi_k$. The wavelet $\phi_k$ may then be forward projected followed by normalization of the forward projected wavelet $P\phi_k$. The forward projection and normalization of the wavelet may be represented as:

$$q_k = P\phi_k, \, q_k = q_k/\|qk\| \quad (5)$$

where $P\phi_k$ is the forward projection of the wavelet $\phi_k$ and $q_k$ is a normalized forward projected wavelet corresponding to the residual image signal $r_k$.

Subsequently, a significant coefficient $s_k$ may be determined by computing a scalar product of the forward projected wavelet $q_k$ and the residual image signal $r_k$. The computation of the significant coefficient may be represented as:

$$s_k = \langle q_k, r_k \rangle \quad (6)$$

where $s_k$ is a significant coefficient of the residual image signal $r_k$.

In addition, the significant coefficient $s_k$ is appended to the plurality of significant coefficients 144 (See FIG. 5). The significant coefficient $s_k$ may be used to update the residual image signal $r_k$ as:

$$r_{k+1} = f - \sum_{n=0}^{k} s_n q_n \quad (7)$$

where $r_{k+1}$ is updated residual data signal.

Further, the plurality of significant coefficients corresponding to the updated residual image signal $r_{k+1}$ may be computed using equation (6) as detailed in steps 96-102 (See FIG. 3). A least squares problem using equation (8) is solved to update the numerical values of the selected plurality of significant coefficients. The least squares problem may be solved by minimizing:

$$\left| f - \sum_{n=0}^{k} s_n q_n \right|^2 \quad (8)$$

In one embodiment, the least square problem may be solved with a constraint that the selected plurality of significant coefficients are non-zero and coefficients of rest of the wavelets of the acquired data signal may be zero.

After iterating the steps 96-104 until the criterion in the decision step 106 is satisfied, the plurality of significant coefficients selected in steps 96-106 may then be used in step 108 for reconstructing the image.

The conventional methods employing QR decomposition to orthogonalize the forward projected wavelets denoted by $q_n$ require all the $q_n$'s to be stored in the computer memory. Further, with increasing number of significant coefficients selected, the orthogonalization via QR decomposition step is computationally costly. The method described in the present embodiment solves the least-square problem in equation (8) implicitly by keeping track of the previously selected significant coefficients, and without requiring the storage of all the forward projections $q_n$ of the selected wavelets. By applying the illustrated technique the processing time for reconstructing an image may be dramatically reduced. In addition, the storage space required to store reconstructed image may also be substantially reduced.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:
1. A signal processing method, comprising:
initializing a residual data signal representative of an acquired data signal by a processing subsystem;
determining a significant coefficient corresponding to the residual data signal;
updating the residual data signal using the significant coefficient to generate an updated residual data signal;
iteratively determining significant coefficients to generate a plurality of significant coefficients using the updated residual data signal;
updating the plurality of significant coefficients by using a successive approximation technique, to improve the numerical accuracy of the significant coefficients; and
reconstructing by the processing subsystem, a data signal using the updated plurality of significant coefficients.

2. The method of claim 1, wherein the acquired data signal is representative of image data, audio data, or a combination thereof.

3. The method of claim 1, wherein initializing the residual data signal further comprises back-projecting the residual data signal.

4. The method of claim 1, wherein determining the significant coefficient comprises:
determining a coefficient having a largest magnitude corresponding to the residual data signal;
identifying a wavelet corresponding to the coefficient having the largest magnitude;

normalizing the wavelet corresponding to the coefficient having the largest magnitude to generate a normalized wavelet; and computing a scalar product of the residual data signal and the normalized wavelet.

5. The method of claim 4, wherein determining the coefficient having the largest magnitude comprises applying a sparsifying transformation to the residual data signal.

6. The method of claim 5, wherein the sparsifying transformation comprises a wavelet transformation, a gradient transformation, or a thresholding transformation.

7. The method of claim 1, wherein iteratively determining the significant coefficient comprises subtracting data signals corresponding to the coefficients in the plurality of significant coefficients from the acquired data signal to determine an updated residual data signal.

8. The method of claim 1, wherein the successive approximation technique comprises a least square technique, a conjugate gradient technique, or a landweber technique.

9. The method of claim 1, further comprising iteratively determining significant coefficients using the updated residual data signal till the number of significant coefficients is equal to a determined value.

10. A system, comprising:
an acquisition subsystem configured to obtain data from an object;
a processing subsystem in operational communication with the data acquisition subsystem, and comprising a signal processing platform configured to:
initialize a residual data signal representative of an acquired data signal;
determine a significant coefficient corresponding to the residual data signal;
update the residual data signal using the significant coefficient to generate an updated residual data signal;
iteratively determine significant coefficients to generate a plurality of significant coefficients using the updated residual data signal;
update the plurality of significant coefficients by using a successive approximation technique to improve the numerical accuracy of the significant coefficients; and
reconstruct a data signal using the updated plurality of significant coefficients to be used by the system for analysis.

11. The system of claim 10, wherein the processing system comprises a computer tomography imaging system, an ultrasound imaging system, a magnetic resonance imaging system, an X-ray imaging system, a positron emission tomgraphy imaging system, or combinations thereof.

12. The system of claim 10, wherein the object comprises a patient, baggage, or industrial parts.

13. The system of claim 10, further comprising a display device for display of transitional images and the reconstructed data.

14. The system of claim 10, wherein the signal processing platform is further configured to iteratively determine the updated residual data signal until the updated residual data signal has a value less than a determined value.

15. The system of claim 10, wherein the data signal is representative of a reconstructed image.

* * * * *

UNITED STATES PATENT AND TRADEMARK OFFICE
CERTIFICATE OF CORRECTION

| | | |
|---|---|---|
| PATENT NO. | : 8,160,342 B2 | |
| APPLICATION NO. | : 12/394398 | |
| DATED | : April 17, 2012 | |
| INVENTOR(S) | : Khare et al. | |

It is certified that error appears in the above-identified patent and that said Letters Patent is hereby corrected as shown below:

In Column 8, Line 3, delete "si" and insert -- $s_1$ --, therefor.

In Column 14, Lines 17-18, in Claim 11, delete "tomgraphy" and insert -- tomography --, therefor.

Signed and Sealed this
Second Day of October, 2012

David J. Kappos
*Director of the United States Patent and Trademark Office*